United States Patent [19]

Markusch et al.

[11] Patent Number: 5,372,875
[45] Date of Patent: Dec. 13, 1994

[54] AQUEOUS TWO-COMPONENT POLYURETHANE-FORMING COMPOSITIONS AND A PROCESS FOR THEIR PREPARATION

[75] Inventors: Peter H. Markusch, McMurray, Pa.; Robin E. Tirpak, Wheeling; James W. Rosthauser, Glendale, both of W. Va.

[73] Assignee: Miles Inc., Pittsburgh, Pa.

[21] Appl. No.: 14,304

[22] Filed: Feb. 5, 1993

Related U.S. Application Data

[63] Continuation of Ser. No. 734,425, Jul. 23, 1991, abandoned.

[51] Int. Cl.⁵ .................. B32B 27/40; C08K 3/20
[52] U.S. Cl. .......................... 428/228; 428/268; 428/423.1; 428/425.6; 524/591; 524/839; 524/840
[58] Field of Search ............ 524/591, 839, 840; 528/44, 60, 61, 65, 68, 66, 80, 85; 428/423.1, 425.6, 228, 268

[56] References Cited

U.S. PATENT DOCUMENTS

| | | | |
|---|---|---|---|
| 3,183,112 | 5/1965 | Gemassmer | 106/316 |
| 3,575,547 | 4/1971 | Cordier et al. | 428/268 |
| 4,612,238 | 9/1986 | Della Vecchia et al. | 428/228 |
| 4,663,377 | 5/1987 | Hombach et al. | 524/591 |
| 4,762,751 | 8/1988 | Girgis et al. | 428/394 |
| 4,904,522 | 2/1990 | Markusch | 428/288 |
| 4,992,507 | 2/1991 | Coogan et al. | 524/591 |

FOREIGN PATENT DOCUMENTS

| | | | |
|---|---|---|---|
| 4022850A | 7/1990 | Germany | 428/228 |
| 57-083533 | 11/1980 | Japan | 428/268 |

*Primary Examiner*—Veronica P. Hoke
*Assistant Examiner*—Patrick Niland
*Attorney, Agent, or Firm*—Joseph C. Gil; Thomas W. Roy

[57] ABSTRACT

The present invention is directed to a process for the preparation of an aqueous two-component polyurethane-forming composition by a) dispersing in water a polyisocyanate which has an isocyanate content of at least 12% by weight and
b) also blending with water either before, during or after dispersing the polyisocyanate, a polyhydroxyl compound which
   i) has a molecular weight of 62 to 10,000,
   ii) contains at least two hydroxyl groups,
   iii) is water soluble or water dispersible,
   iv) does not contain urea or urethane groups and
   v) is selected from the group of polyesters, polylactones, polycarbonates, polyethers, polythioethers, polyacetals, polyether esters, polyester amides and polyamides, wherein the equivalent ratio of isocyanate groups to aqueous groups is 0.8:1 to 6:1.

The present invention is also directed to the aqueous composition prepared by this process and to its use as a binder for fiberglass.

8 Claims, No Drawings

AQUEOUS TWO-COMPONENT POLYURETHANE-FORMING COMPOSITIONS AND A PROCESS FOR THEIR PREPARATION

This application is a continuation, of application Ser. No. 07/734,425 filed Jul. 23, 1991 ABANDONED Feb. 9, 1993.

BACKGROUND OF THE INVENTION

1. Field of the Invention

The present invention is directed to an aqueous two-component polyurethane-forming composition containing a polyisocyanate and a polyhydroxyl compound, a process for its production and its use as a binder for fiberglass.

2. Description of the Prior Art

It is known from U.S. Pat. No. 4,904,522 to use aqueous dispersions of polyisocyanates as binders for fiberglass. When compared to known phenol/formaldehyde resins, the polyisocyanate binders cure at a much lower temperature, do not split off volatile monomers, provide at least the same strength, are not a potential formaldehyde source and do not require an amino alkoxy silane adhesion promoter. However, the polyisocyanate binders disclosed in the copending application have relatively high quantities of unmodified monomeric diisocyanates. Because the presence of monomeric diisocyanates may lead to industrial hygiene problems, it would be beneficial to reduce the content of monomeric diisocyanates as much as possible.

Another deficiency of the polyisocyanate binders disclosed in U.S. Pat. No. 4,904,522 is that it is difficult to achieve complete cure during subsequent heating of the fiberglass mats in the oven zone. During the production of fiberglass mats, the fibers are treated with the aqueous polyisocyanate binders and continuously run through an oven zone in order to evaporate water and to cure the polyisocyanate resins.

When aqueously dispersed polyisocyanates are used as binders, the water serves as the co-reactant for the isocyanate groups to form polyureas. If the isocyanate content of the polyisocyanate binder is too high, water is evaporated in the oven zone before the reaction is complete and as a result, an uncured, unusable fiberglass mat is obtained.

A further disadvantage is that even though the preferred polyisocyanates of U.S. Pat. No. 4,904,522, i.e., polyphenyl polymethylene polyisocyanates, exhibit a low vapor pressure at ambient temperature, they still contain high amounts (as much as 70% by weight) of monomeric diphenyl methane diisocyanates. Upon exposure to the high temperatures in the oven zone these monomeric diisocyanates can be volatilized which results in high concentrations in the exhaust gases. This represents an environmental hazard if these exhaust gases escape into the atmosphere of the workplace or the air surrounding the manufacturing facility.

One method for lowering the isocyanate content of the polyisocyanate binders would be to react the polyisocyanates with polyols to form isocyanate-terminated prepolymers prior to dispersing in water. However, this results in products which have high viscosities at the desired low isocyanate content, i.e., an isocyanate content of less than 10% by weight, based on solids, and thus can be too viscous to disperse in water even if they have been hydrophilically modified.

One method to lower the viscosity of the polyisocyanate binder would be to use volatile solvents. This method is undesirable because of the potential of explosions and/or fires as well as the environmental disadvantages of using volatile organic compounds. In accordance with the present invention water acts a carrier to lower the viscosity of the polyurethane-forming binder.

Another method of avoiding uncured polyisocyanate binders is to incorporate catalysts which promote the isocyanate/water reaction in the aqueously dispersed polyisocyanate binders. However, this method also does not result in a complete cure of the polyisocyanate prior to evaporation of water in the oven zone.

Accordingly, it is an object of the present invention to provide aqueously dispersed binders which overcome the deficiencies of the previously described binders. It is an additional object to provide aqueously dispersed polyisocyanate binders which need only small amounts of water to cure and which develop their final properties much more rapidly under the given conditions. It is an additional object of the present invention to provide aqueously dispersed binders that possess excellent adhesion, especially to glass fibers.

Surprisingly, this object may be achieved in accordance with the present invention as described hereinafter.

SUMMARY OF THE INVENTION

The present invention is directed to a process for the preparation of an aqueous two-component polyurethane-forming composition by
  a) dispersing in water a polyisocyanate which has an isocyanate content of at least 12% by weight and
  b) also blending with water either before, during or after dispersing the polyisocyanate, a polyhydroxyl compound which
    i) has a molecular weight of 62 to 10,000,
    ii) contains at least two hydroxyl groups,
    iii) is water soluble or water dispersible,
    iv) does not contain urea or urethane groups and
    v) is selected from the group of polyesters, polylactones, polycarbonates, polyethers, polythioethers, polyacetals, polyether esters, polyester amides and polyamides,
wherein the equivalent ratio of isocyanate groups to hydroxyl groups is 0.8:1 to 6:1.

The present invention is also directed to the polyurethane-forming composition prepared by this process and to its use as a binder for fiberglass.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3- and/or -1,4-diisocyanate, 1-isocyanato-3,3,5-trimethyl-5-isocyanatomethyl cyclohexane (isophorone diisocyanate), 2,4- and/or 2,6-hexahydrotoluylene diisocyanate, hexahydro-1,3-and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene- 1,5-diisocyanate, triphenylmethane-4,4',4''-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, uretdione groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or preferably they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae H—Z—X—Y—R''    or

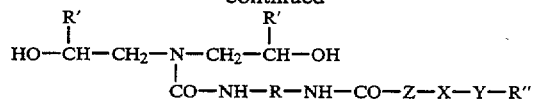

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R'' represents a monovalent hydrocarbon radical having from 1 to 12 carbon atoms, preferably an unsubstituted alkyl radical having from 1 to 4 carbon atoms,
X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units,
Y represents oxygen or —NR'''— wherein R''' has the same definition as R'' and
Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the propolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

In accordance with the present invention the aqueous dispersion also contains one or more polyhydroxyl compounds which are either water soluble or water dispersible, optionally in the presence of an external emulsifier. The polyhydroxyl compounds react with the polyisocyanates in a subsequent heating step during which the water is evaporated. It is also possible to react the polyhydroxyl compounds with the polyisocyanates at ambient temperature. In accordance with this embodiment the reaction between the isocyanate groups and hydroxyl groups occurs after the aqueous composition has been applied to a suitable substrate. In accordance with the present invention it is possible to prepare coatings from the aqueous which composition have an excellent surface appearance and do not contain bubbles.

Suitable polyhydroxyl compounds have a molecular weight (as determined by end group analysis) of 62 to 10,000; contain two or more hydroxyl groups; are either water soluble or dispersible in water, optionally in the presence of an external emulsifier; do not contain urea or urethane groups due to the fact that these groups increase the viscosity and hydrophobicity of the polyhydroxyl compounds and make it more difficult to maintain them dissolved or dispersed in water; and are selected from polyhydroxyl polyesters, polylactones, polycarbonates, polyethers, polythioethers, polyacetals, polyether esters, polyester amides and polyamides.

The polyhydroxyl compounds are known from polyurethane chemistry and have a molecular weight of 400 to 10,000, preferably 1000 to 6000. Also suitable are the known low molecular weight polyols having a molecular weight of 32 to less than 400. Examples of these polyhydroxyl compounds are disclosed in U.S. Pat. No. 4,925,885, the disclosure of which is herein incorporated by reference.

An advantage of polyhydroxyl compounds which are rendered water soluble or water dispersible by chemically incorporated emulsifiers over those which are rendered water soluble or dispersible by the use of an external emulsifier is that an extra mixing step is avoided for mixing the emulsifier with the polyhydroxyl compound. Any of the previously mentioned polyhydroxyl compounds may be rendered water soluble or dispersible by the incorporation of polyethylene oxide units, salt (ionic) groups or potential salt (ionic) groups which are subsequently neutralized during their preparation.

When the aqueous dispersions containing blocked polyisocyanates and polyhydroxyl compounds are to be used as binders for fiberglass, the water soluble, low molecular weight polyols such as butane diol are preferred polyhydroxyl compounds because these binders provide a combination of hardness and solvent resistance which is very desirable for this application. More preferred are low molecular weight polyols which are not volatilized under the conditions which are used to cure the coating composition.

The polyhydroxyl compounds are added to the aqueous dispersions in an amount which is sufficient to provide an equivalent ratio of isocyanate groups to hydroxyl groups of 0.8:1 to 6:1, preferably 1.2:1 to 4:1.

If it is desired to further reduce the isocyanate group content of the dispersed polyisocyanate to ensure that the subsequent reaction with the polyhydroxyl compound will reduce the isocyanate content to very low levels, a portion of the isocyanate groups of the dispersed polyisocyanate may be reacted with isocyanate-reactive compounds which are more reactive with isocyanate groups than water. Examples of these compounds are the polyamines having a molecular weight of less than 400 and containing two or more primary and/or secondary amino groups which are disclosed in copending application, U.S. Ser. No. 07/677,010, filed Mar. 28, 1991, the disclosure of which is herein incorporated by reference; and the primary or secondary monoamines containing at least one hydroxyl group disclosed in copending application, U.S. Ser. No. 07/529,056, filed May 25, 1990, the disclosure of which is herein incorporated by reference; or mixtures of these compounds as disclosed in copending application, U.S. Ser. No. 07/676,670, filed Mar. 28, 1991, the disclosure of which is herein incorporated by reference.

The amount of the these isocyanate-reactive compounds is chosen to provide an equivalent ratio of isocyanate-reactive groups which are more reactive than water to isocyanate groups of the dispersed polyisocyanate of less than 0.4:1.0, preferably less than 0.2:1.0 and more preferably less than 0.1:1.0. Lower limits for the amount of these compounds are chosen to provide an equivalent ratio of isocyanate-reactive groups which are more reactive than water to isocyanate groups of 0.02:1.0, preferably 0.05:1.0.

The polyhydroxyl compound may be added to the water either before, during or after the polyisocyanate has been dispersed. In one embodiment of the present invention, the polyisocyanate is first dispersed in water and then the polyhydroxyl compound is added to the dispersed polyisocyanate. In this embodiment the polyisocyanate is dispersed in water in a first mixing step, and subsequently the polyhydroxyl compound is blended with the dispersed polyisocyanate in a second mixing step. Suitable apparatus for performing these mixing steps have previously been disclosed for dispersing the polyisocyanate in water and also include the mixing apparatus disclosed in copending application, U.S. Ser. No. 07/671,002, filed Mar. 28, 1991, the disclosure of which is herein incorporated by reference.

If the previously described polyamines and/or primary or secondary monoamines containing at least one hydroxyl group are used to modify the dispersed polyisocyanate, they may be added at the same time or before the polyhydroxyl compound. The advantage of adding them with the polyhydroxyl compound is that it eliminates one mixing step.

In accordance with a preferred embodiment of the present invention, it is advantageous to include a catalyst that promotes the reaction of isocyanate groups with hydroxyl groups. The catalyst may be added to the polyisocyanate or preferably the polyhydroxyl compound or the dispersing water.

Suitable catalysts include tertiary amines which may optionally contain an isocyanate-reactive group, e.g., a hydroxyl group; Mannich bases of secondary amines such as dimethyl amine, aldehydes such as formaldehyde, ketones such as acetone, methyl ethyl ketone or cyclohexanone, and phenols such as phenol, nonyl phenol or bis-phenol; amino silanes having carbon-silicon bonds, e.g., those disclosed in U.S. Pat. No. 3,620,984 such as 2,2,4-trimethyl-2-silamorpholine and 1,3-diethyl aminomethyl tetramethyl disiloxane; nitrogen-containing bases such as tetraalkyl ammonium hydroxides; alkali metal hydroxides such as sodium hydroxide; alkali metal phenolates such as sodium phenolate; or alkali metal alcoholates such as sodium methylate; and hexahydrotriazines.

Preferred catalysts are organometallic compounds, especially organotin compounds. Examples of these catalysts include tin(II) salts of carboxylic acids such as tin(II)acetate, tin(II)octoate, tin(II)ethyl hexoate, tin(II)laurate and tin(IV) compounds such as dibutyl tin oxide, dibutyl tin dichloride, dibutyl tin diacetate, dibutyl tin dilaurate, dibutyl tin maleate and dioctyl tin diacetate.

Especially preferred catalysts are those which promote the reaction between isocyanate groups and hydroxyl groups over the reaction between isocyanate groups and water. Examples of such catalysts include dimethyl tin dichloride and dimethyl tin dilaurate.

Another group of preferred catalysts are the heat-activatable catalysts such as dimethyl tin dilauryl mercaptide and dibutyl tin dilauryl mercaptide.

In accordance with the present invention, it is also possible to incorporate additives into the aqueous polyurethane-forming compositions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous dispersions of polyisocyanates and polyhydroxyl compounds obtained in accordance with the present invention may be used in any of the known applications for such systems, e.g., as coatings or as binders for fiberglass. The dispersions according to the present invention are also suitable to improve the properties (such as adhesion, solvent resistance and abrasion resistance) of many other aqueous polymer dispersions such as acrylic, epoxy, polyvinyl acetate and styrene/butadiene rubber dispersions.

The invention is further illustrated but is not intended to be limited by the following examples in which all parts and percentages are by weight unless otherwise specified.

EXAMPLES

Example 1

Preparation of an aromatic water-dispersible polyisocyanate

A three liter round bottom flask equipped with a thermometer, drying tube, condenser, and stirrer was charged with 549 parts of Crude MDI[1] and 274.5 parts of a monofunctional poly(ethylene oxide) ether[2]. The temperature of the reaction flask was increased to 70° C. The reaction proceeded at this temperature for four hours at which time the isocyanate content was determined by titration to be 20.42% (theoretical NCO=20.75%). The modified polyisocyanate was cooled to ambient temperature and placed in dry containers.

1. An aniline/formaldehyde condensation product containing 4,4'-diphenylmethane diisocyanate and about 50% of higher functionality homologs and having an isocyanate content of about 31.5% and a viscosity at 25° C. of 200 mPa.s.
2. A polyether monohydric alcohol having a molecular weight of 2200 and prepared from n-butanol, ethylene oxide and propylene oxide (molar ratio of ethylene oxide to propylene oxide- 83:17).

Example 2

Preparation of a water soluble (salt group-containing) polyol

To a solution (55° C.) of 29.3 parts of sodium hydroxide dissolved in 193.95 parts of distilled water, were added 100 parts of dimethylolpropionic acid. The water was removed in a rotary evaporator, which was immersed in a heated water bath held at 70° C., over a period of 3 hours. The salt was ground with a mortar and pestle and then dried at 100° C. for 3 hours under vacuum.

Example 3

Preparation of a two-component aqueous polyurethane coating composition containing salt groups 100 grams of the water-dispersible polyisocyanate of Example 1 were dispersed under agitation in a two liter resin flask containing 300 grams of demineralized water at ambient temperature. To the dispersed polyisocyanate was added a mixture of 31.47 grams of the salt group-containing diol of Example 2, 94.47 grams of demineralized water, and 0.026 grams of dimethyltin dichloride (Cotin 210, a catalyst available from Cosan Chemical Corporation). The dispersion had a viscosity of 10 mPa.s at 25° C. and a pH of 5.7. To a portion of the dispersion was added 0.05% of a silicone containing flow agent (SILWET L-77, available from Union Carbide. A film was prepared within 3 minutes after dispersing the polyisocyanate. The film (5 mil wet on glass, air dried for 30 minutes then oven cured for 30 minutes at 150° C.) was cloudy, and continuous. It had a pencil hardness of 2H, adhesion to tape test of 4B-5B, MEK double rub of >200, and was sensitive to the water spot test.

Example 4

Preparation of the two-component aqueous polyurethane coating composition 80 grams of the water-dispersible polyisocyanate of Example 1 was dispersed under agitation in a two liter resin flask containing 250 grams of demineralized water at ambient temperature. To the dispersed polyisocyanate was added a mixture of 14.5 grams of 1,4-butanediol, 33.5 grams of demineralized water, and 0.02 grams of the catalyst of Example 3. The dispersion had a viscosity of 15 mPa.s at 25° C. and a pH of 3.26. To a portion of the dispersion was added 0.05% of silicone containing flow agent of Example 3. A film was prepared within 3 minutes after dispersing the polyisocyanate. The film (5 mil wet on glass, air dried for 30 minutes then oven cured for 30 minutes at 150° C.) was clear, yellow and continuous. It had a pencil hardness of 2H, adhesion to tape test of 5 B, MEK double rub of >200, and was not sensitive to the water spot test.

Example 5

Preparation of a two-component aqueous polyurethane coating composition 50 grams of the water-dispersible polyisocyanate of Example 1 was dispersed under agitation in two liter resin flask containing 329.3 grams of demineralized water at ambient temperature. To the dispersed polyisocyanate was added a mixture of 56.54 grams of a polyether diol having an OH number of 200 and prepared by propoxylating bisphenol A, 3.2 grams of ethoxylated nonyl phenol having a molecular weight of 1540 (Surfonic N-300, available from Jefferson Chemical Co.) and 0.022 grams of the catalyst of Example 3. The dispersion had a viscosity of 10 mPa.s at room temperature and a pH of 3.5. To a portion of the dispersion was added 0.05% of the silicone containing flow agent of Example 3. A film was prepared within 3 minutes after dispersing the polyisocyanate. The film (5 mil wet on glass, air dried for 30 minutes then oven cured for 30 minutes at 150° C.), was clear and continuous, with a rough surface containing bubbles. It had a pencil hardness of 4 B, adhesion to tape test of 5 B, MEK double rub of 50, and was not sensitive to the water spot test.

Example 6

Preparation of a two-component aqueous polyurethane coating composition 80 grams of the water-dispersible polyisocyanate of Example 1 was dispersed under agitation in a two liter resin flask containing 347 grams of demineralized water at ambient temperature. To the dispersed polyisocyanate was added a mixture 32.25 grams of a polyester triol (Tone 301, a polycaprolactone triol, available from Union Carbide), 3.95 grams of the ethoxylated nonyl phenol of Example 5, and 0.023 grams of the catalyst of Example 3. The dispersion had a viscosity of 10 mPa.s at room temperature and a pH of 3.0. To a portion of the dispersion was added 0.05% of the silicone containing flow agent of Example 3. A film was prepared within 3 minutes after dispersing the polyisocyanate. The film (5 mil wet on glass, air dried for 30 minutes then oven cured for 30 minutes at 150° C.) was clear, slightly yellow and continuous. It had a pencil hardness of 2H, adhesion to tape test of 5 B, MEK double rub of >200, and was not sensitive to the water spot test.

Film testing procedures:

Pencil Hardness—ASTM D3363

Adhesion to Tape Test—ASTM D3359-83

MEK Double Rubs—Number of double rubs with a cotton cheese cloth saturated with MEK that were necessary to begin to remove the coating from the glass plate.

Water Spot Sensitivity—One drop of water was placed on the coating for one hour, then the film is checked to see if the water had any effect. If the film has a haze or is easier to remove from the glass where the water spot was it would be considered sensitive.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A process for the preparation of a fiberglass mat which comprises treating fiberglass with an aqueous two-component polyurethane-forming composition which is prepared by a process which comprises
   a) dispersing in water a polyisocyanate which has an isocyanate content of at least 12% by weight and
   b) blending with water either before, during or after dispersing the polyisocyanate, a polyhydroxyl component which consists essentially of at least one compound which
      i) has a molecular weight of 32 to less than 400,
      ii) contains at least two hydroxyl groups,
      iii) is water soluble or water dispersible, and
      iv) does not contain urea or urethane groups,
   wherein the equivalent ratio of isocyanate groups to hydroxyl groups is 0.8:1 to 6:1, and curing said composition to form a bubble free product.

2. The process of claim 1 wherein said dispersed polyisocyanate is rendered hydrophilic by reaction with a compound containing a lateral or terminal nonionic hydrophilic group.

3. The process of claim 1 wherein said polyhydroxyl compound comprises butane diol.

4. The process of claim 2 wherein said polyhydroxyl compound comprises butane diol.

5. A process for the preparation of a polyurethane coating which has an excellent surface appearance and does not contain bubbles which comprises
   a) dispersing in water a polyisocyanate which has an isocyanate content of at least 12% by weight and
   b) blending with water either before, during or after dispersing the polyisocyanate, a polyhydroxyl compound which
      i) has a molecular weight of 62 to 10,000,
      ii) contains at least two hydroxyl groups,
      iii) is water soluble or water dispersible,
      iv) does not contain urea or urethane groups and
      v) comprises a member selected from the group consisting of polyesters, polylactones, polycarbonates, polyethers, polythioethers, polyacetals, polyether esters, polyester amides and polyamides,
   wherein the equivalent ratio of isocyanate groups to hydroxyl groups is 0.8:1 to 6:1,
   c) applying the mixture obtained in b) to a substrate and
   d) reacting the isocyanate groups and hydroxyl groups to form said polyurethane coating.

6. The process of claim 5 wherein said dispersed polyisocyanate is rendered hydrophilic by reaction with a compound containing a lateral or terminal nonionic hydrophilic group.

7. The process of claim 5 wherein said polyhydroxyl compound is water soluble and has a molecular weight of 62 to less than 400.

8. The process of claim 6 wherein said polyhydroxyl compound is water soluble and has a molecular weight of 62 to less than 400.

* * * * *